United States Patent
Harrap

Patent Number: 6,126,552
Date of Patent: *Oct. 3, 2000

[54] POWERED RIDE APPARATUS

[76] Inventor: Neil Horace Harrap, 11 St. Mary Street, Thorndon, Wellington, New Zealand

[*] Notice: This patent is subject to a terminal disclaimer.

[21] Appl. No.: 09/284,184
[22] PCT Filed: Oct. 6, 1997
[86] PCT No.: PCT/NZ97/00131
§ 371 Date: Sep. 20, 1999
§ 102(e) Date: Sep. 20, 1999
[87] PCT Pub. No.: WO98/15331
PCT Pub. Date: Apr. 16, 1998

[30] Foreign Application Priority Data

Oct. 6, 1996 [NZ] New Zealand .......................... 299426

[51] Int. Cl.[7] .................................................. A63G 31/16
[52] U.S. Cl. ........................... 472/130; 472/118; 472/133
[58] Field of Search ..................... 472/118, 119, 472/130, 137, 7, 8, 133

[56] References Cited

U.S. PATENT DOCUMENTS

| | | | |
|---|---|---|---|
| 4,790,755 | 12/1988 | Leduc et al. | 434/37 |
| 4,898,377 | 2/1990 | Roche | 472/130 |
| 5,782,699 | 7/1998 | Harrap | 472/118 |
| 5,842,928 | 12/1998 | McGinnis | 472/118 |

Primary Examiner—Kien T. Nguyen
Attorney, Agent, or Firm—Woodard, Emhardt, Naughton Moriarty & McNett

[57] ABSTRACT

A powered ride apparatus for swinging a rider attached to a craft through the air for excitement, comprises a support means such as a cable extending between at least two anchor points positioned substantially opposite each other at a height above the ground, and a swing cable suspended from the support means, and a craft adapted to carry a rider during a ride, attached to the lower end of the swing cable and comprising an on-board propulsion system comprising a motor driving a propeller and a steering system operable by the rider during the ride, enabling the rider to steer the craft during the ride as the craft swings on the swing cable.

10 Claims, 4 Drawing Sheets

POWERED RIDE APPARATUS

FIELD

The invention comprises a swinging powered ride apparatus.

BACKGROUND

Various forms of swinging and hanging devices have been designed to provide excitement to passengers in the form of "ground rush" and the feel of centrifugal force. A conventional swing generally comprises one or two cables connected to a support structure and which carry a seat for the rider. Another form of amusement is a "bungy jump". A further form of amusement is the steerable swing device disclosed in PCT patent application publication WO 95/22385. Support cables are strung across a gully, canyon, valley or similar natural or man-made cavity from which a swing cable is suspended. The swing cable supports a passenger carrying craft which is winched up to a desired height by a winch cable and then released, such that the craft swings around the gully. The craft includes a rudder which can be operated to provide lateral movement to the craft during the swing.

SUMMARY OF INVENTION

The present invention provides an improved or at least alternative form of ride apparatus.

In broad terms the invention comprises a powered ride apparatus for swinging a rider attached to a carrier through the air for excitement, comprising:

a support means extending between at least two anchor points positioned substantially opposite each other at a height above the ground;

a swing cable suspended vertically from the support means at a position approximately midway between the at least two anchor points; and a craft adapted to carry a rider during a ride, attached to the lower end of the swing cable and comprising an on-board propulsion system comprising a motor driving a propeller and a steering system operable by the rider during the ride, enabling the rider to steer the craft during the ride as the craft swings on the swing cable.

Preferably the propeller is carried in a pivot mounting enabling the propeller to be pivoted about an axis parallel to the swing cable. The steering system is connected to the propeller so that the pivotal position of the propeller about said axis is controlled by the steering system, and the craft is steered by moving the pivotal position of the propeller.

Preferably the motor speed can be varied by the rider during the ride.

BRIEF DESCRIPTION OF THE DRAWINGS

Two preferred form swinging powered ride apparatus of the invention are described with reference to the accompanying drawings, by way of example only and without intending to be limiting, in which.

DESCRIPTION OF THE PREFERRED FORM

Figure 1:
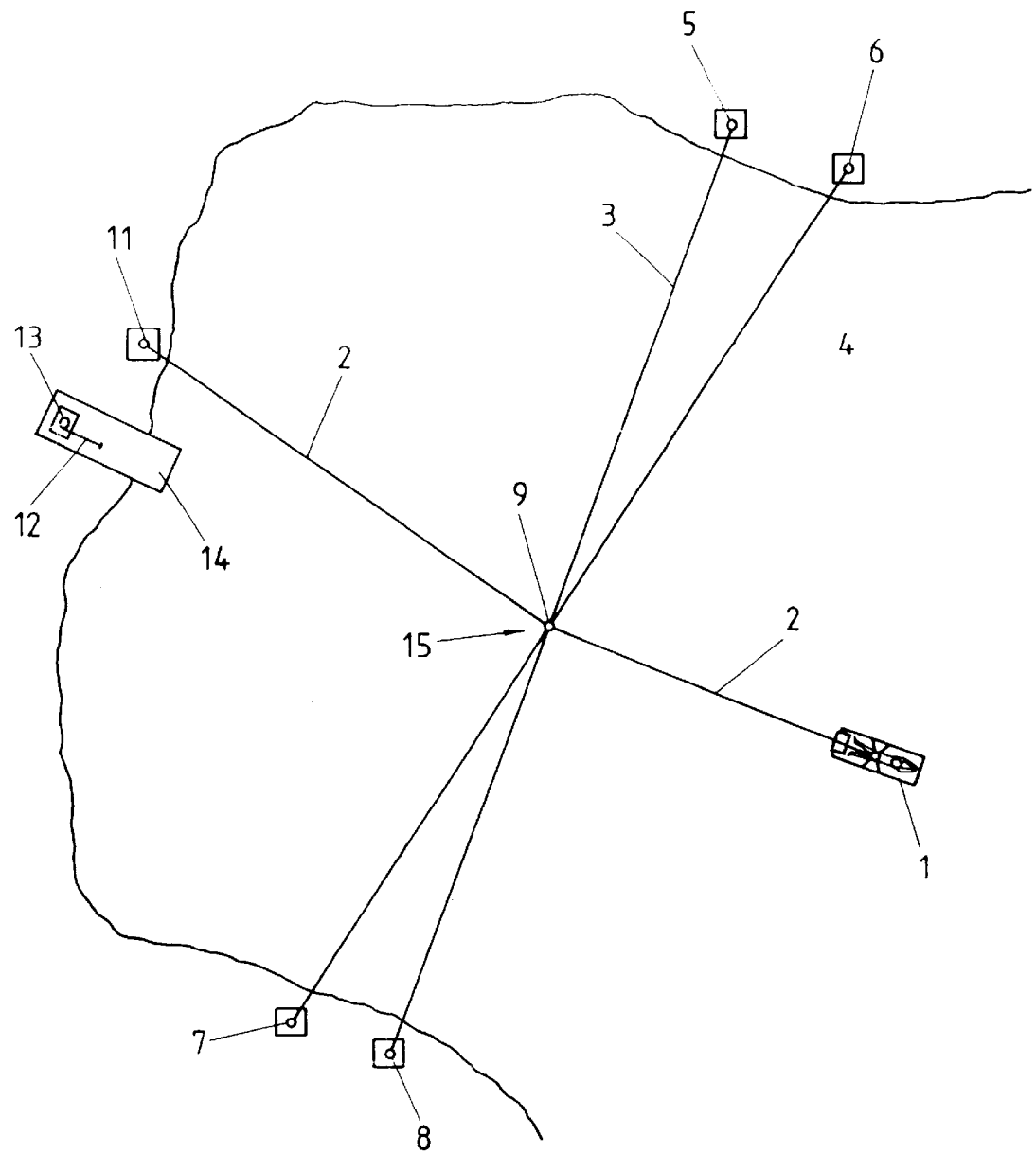
FIG. 1 is a plan view of one form of powered ride apparatus.
Figure 2:
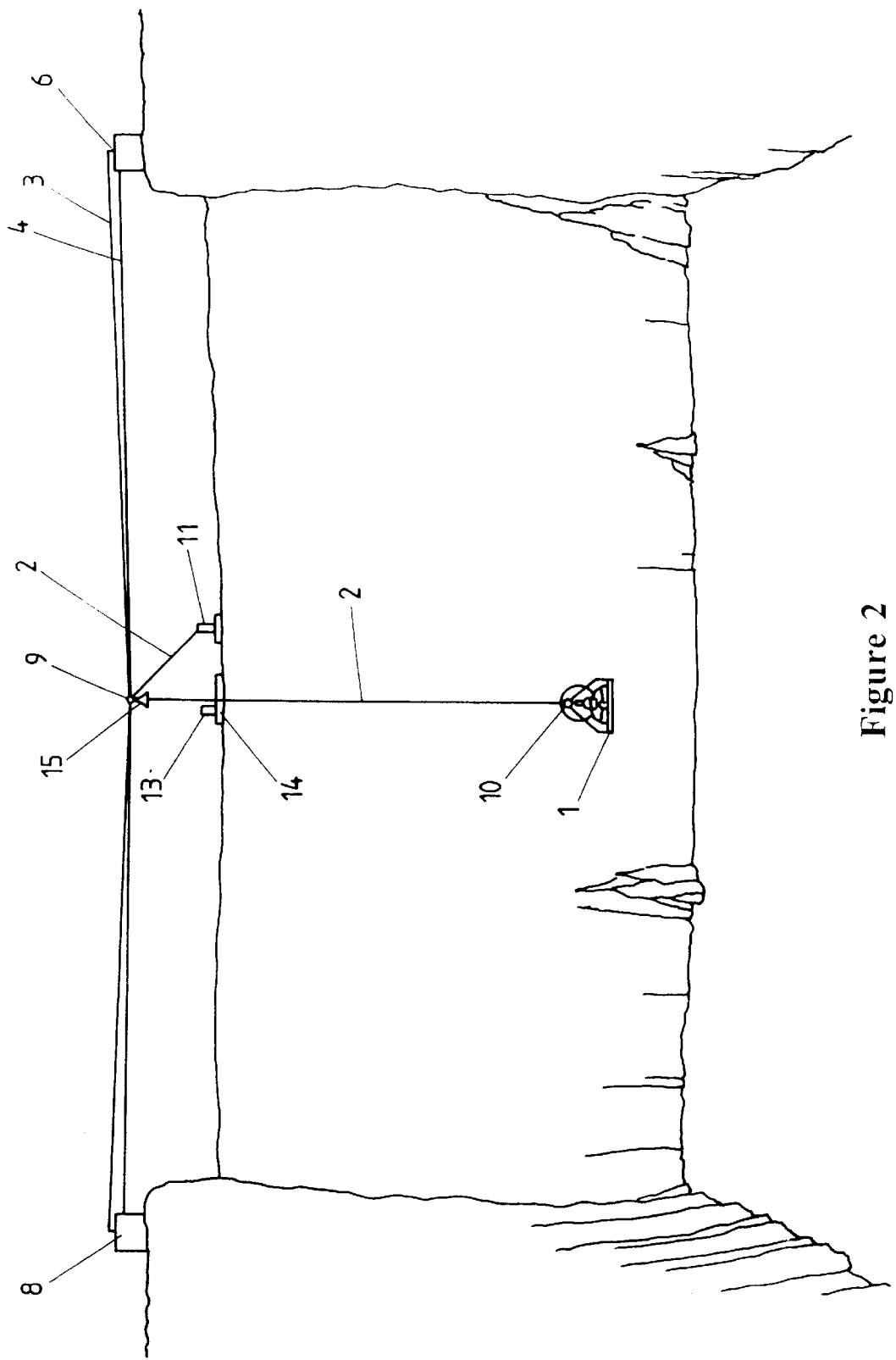
FIG. 2 is a front view of the powered ride apparatus.
Figure 3:
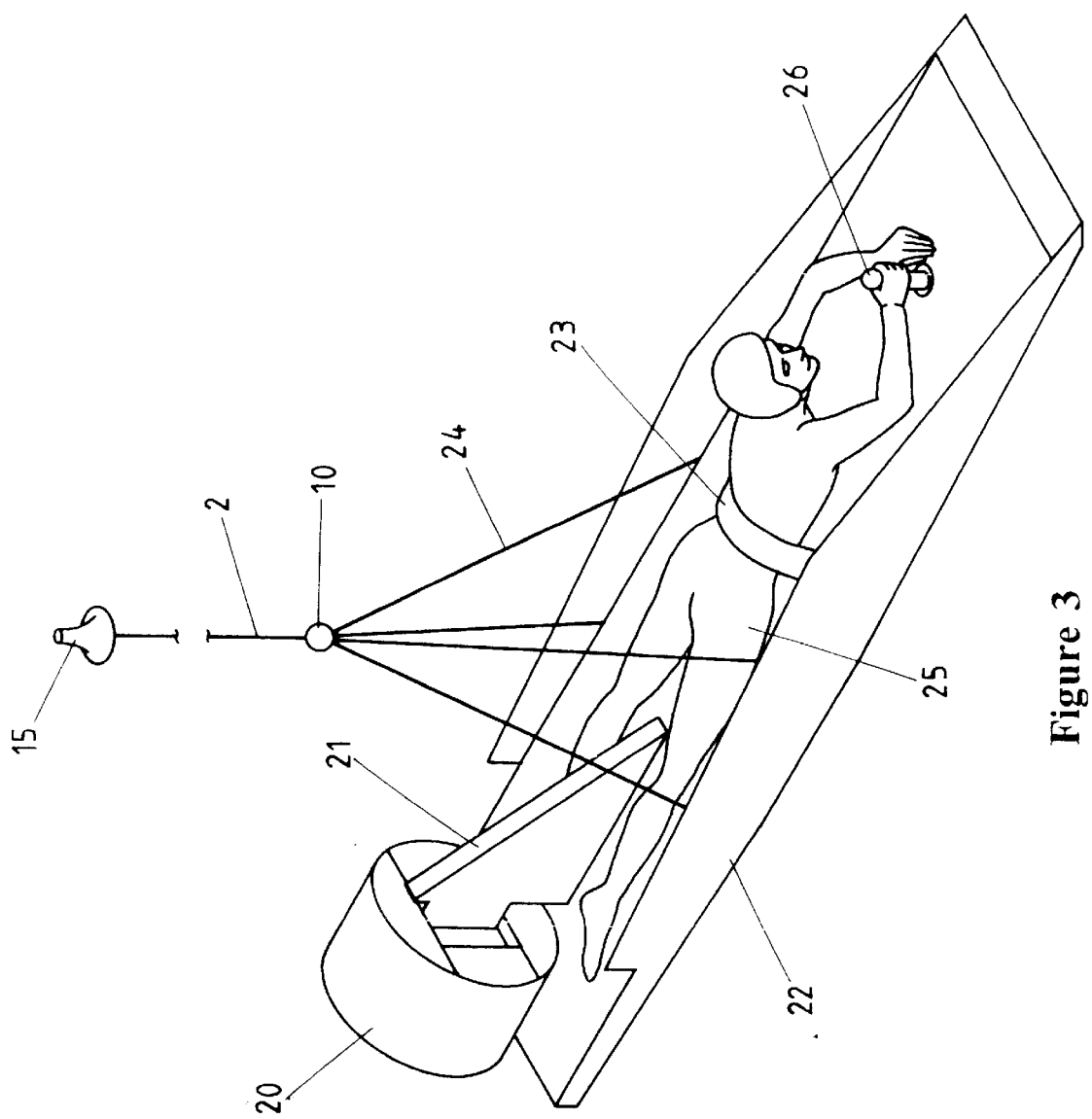
FIG. 3 is a perspective view of the carrier of the powered ride apparatus.

Referring to FIGS. 1 to 3 the first preferred form apparatus comprises two support cables 3 and 4, four anchor points 5, 6, 7 and 8, a swing cable 2, a swing cable pulley mechanism 9, a bellmouth cable exit 15, a winch drum 11, a swivel joint 10 and a suspended passenger carrying craft 1 comprising an engine 20.

The support cables 3 and 4 are anchored at the sides of a gully or similar natural or man made cavity by anchor points 5, 6, 7 and 8. The support cables 3 and 4 are strung across the gully such that they cross and form a relatively stable anchor at their junction point for securing the swing cable pulley mechanism 9. Alternatively a single or multiple support cable system may be used, and the anchor points may be atop towers instead of at the sides of a gully or similar.

The craft 1 is supported at the swivel joint 10 by the swing cable 2 which runs through the bellmouth cable exit 15 and the pulley mechanism 9 to the winch drum 11. Alternatively, the swing cable 2 may be fixed at the support cables 3 and 4 junction point. The swivel joint 10 allows the craft 1 to rotate freely about the swing cable 2. The bellmouth cable exit 15 is shaped to allow bending of the swing cable 2 in any direction whilst supporting the craft 1. This arrangement allows the craft 1 to swing in arcs about the bellmouth cable exit 15.

In the first preferred form shown the craft 1 comprises a platform 22, securing straps 23, support cables 24, a motor and a propeller surrounded by a shroud 20, a pivot mounting 21 which carries the propeller so that the propeller can be pivoted about an axis parallel to the swing cable to steer the craft, and a joystick 26.

The joystick operates both the throttle of the motor to control the engine speed, and is connected by cables to control turning the motor. A rider 25 secured, in the preferred form craft shown, lying in a prone position on the craft by securing straps 23, may operate the joystick 26 to control the motor speed by pushing the joystick forward and back, and to steer the craft by pushing the joystick from side to side, steering the motor and propeller to turn from one side or the other. Alternatively the joystick 26 may be replaced by a small steering wheel or steering bars, and an associated hand operated throttle control for the motor. The throttle control may be a lever action control mounted to the steering bars so that the rider holding the steering bars on either side to steer the craft can also operate the throttle control with the fingers of one hand. By increasing or decreasing the motor speed, the rider can increase and decrease the swing of the craft on the swing cable 2, making the craft swing to higher or lower heights. By controlling the thrust and direction of the motor and propeller, the rider can steer and turn the craft during the swing so that the craft follows an oval or FIG. 8 path instead of simply swinging back and forth, and prolong the duration of the swing as desired. The rider may cause the craft to perform other aerobatic manoeuvres while carried on the end of the swing cable.

The winch 11 can be used to lower the craft 1 to the ground such that riders can easily embark or disembark the craft, and to raise the craft above the ground for the ride. A rider may then operate the motor to cause the craft to begin swinging or moving in small and then increasingly larger arcs. Alternatively, the craft may be winched up to a start position, such as to a platform 14, from which the craft may be released to launch the craft at the start of the ride. During the ride the rider uses the joystick 26 to operate the motor and to steer the craft. At the end of the ride, swing cable 2 is unloaded from the winch drum 11 to lower the craft to the ground to allow the rider to disembark. Another rider then gets on and is strapped in position on the craft, and winch cable 12 is attached to the back of the craft and the craft is then winched back to the platform 14 to be released to launch the next ride.

It is possible that the winch drum 11 may also be used to vary the swing radius by loading or unloading the swing cable 2 such that the length of the swing cable 2 between the bellmouth cable exit 15 and the craft 1 is shortened or lengthened. A winch drum operator or control system (not shown) may vary the swing radius during a ride such that the craft is in close proximity to the ground for longer, or such that the craft travels closer to a side of the gully than it would with a fixed swing radius. In this fashion, the craft 1 can follow the terrain of the gully more closely and for longer periods. Terrain following increases the experience of "ground rush" and heightens the excitement of the ride.

Figure 4:
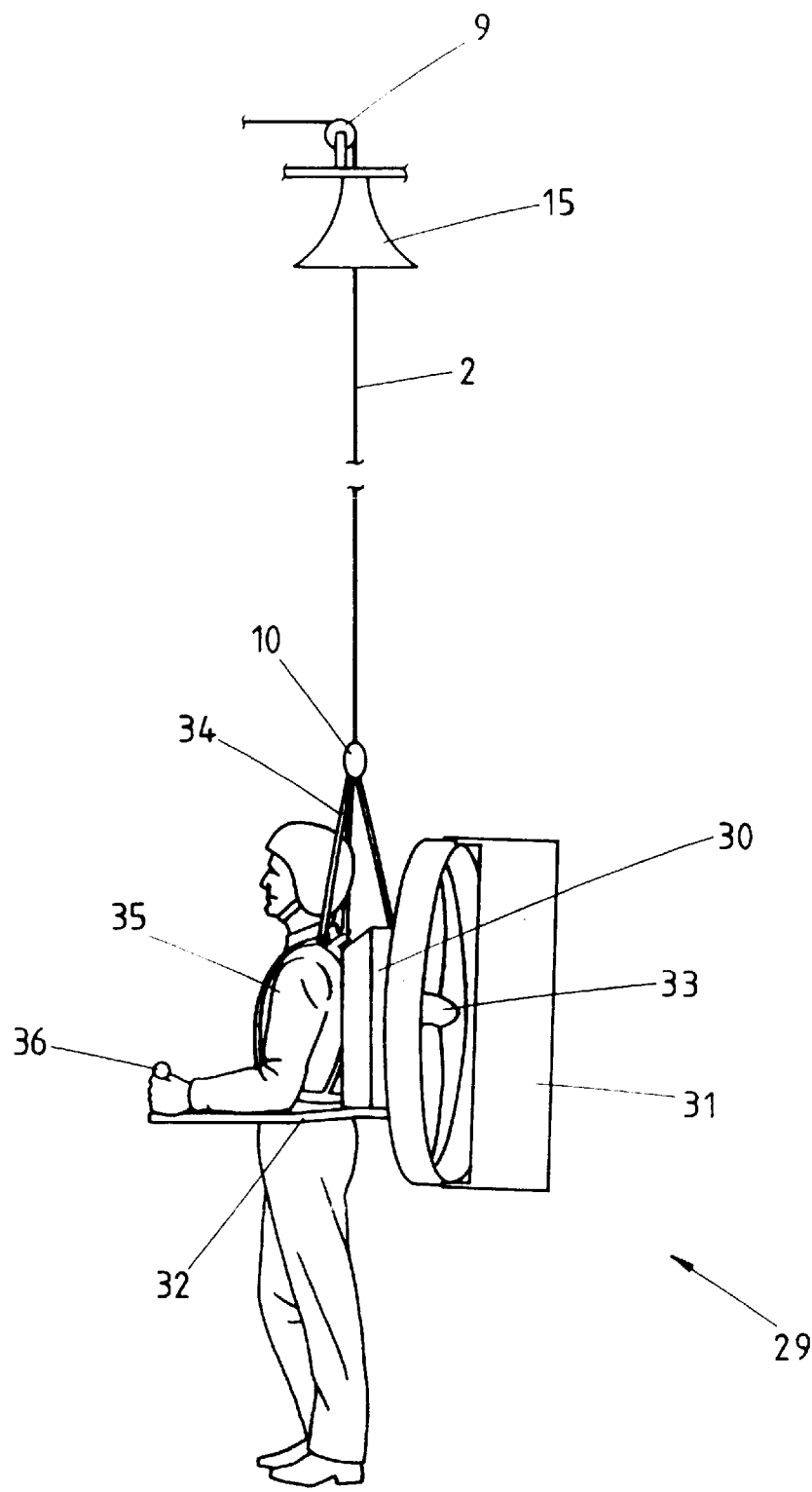
FIG. 4 is a side view of a second preferred form powered ride apparatus.

Referring to FIG. 4, in an alternative form craft 29, carrying rider 35 comprises a harness 34, a support frame 32, a motor 30 driving a propeller 33 and rudders 31, and a joystick 36 The harness 34 of the support means 29 is rotatably secured to the swing cable 2 at the swivel joint 10. The harness 34 carries the support frame 32 and secures the rider such that the support frame 32 is worn as a backpack by the rider 35. The support frame 32 carries the motor 30 propeller 33, and rudder 31, which the rider controls with joystick 36. The rider 35 is able to control the forward and reverse thrust of the motor means 30 as well as the direction of thrust (via the rudder 31) using the joystick 36. In this way the rider 35 controls the size and direction of the swing as well as the duration of the ride as previously described.

The foregoing describes the invention including preferred forms thereof. Alterations and modifications as will be obvious to those skilled in the art are intended to be incorporated within the scope hereof as defined in the claims.

What is claimed is:

1. A powered ride apparatus for swinging a rider attached to a carrier through the air for excitement, comprising:
   a support means extending between at least two anchor points positioned substantially opposite each other at a height above the ground;
   a swing cable suspended vertically from the support means at a position approximately midway between the at least two anchor points; and
   a craft adapted to carry a rider during a ride, attached to the lower end of the swing cable and comprising an on-board propulsion system comprising a motor driving a propeller and a steering system operable by the rider during the ride, enabling the rider to steer the craft during the ride as the craft swings on the swing cable.

2. A powered ride apparatus according to claim 1 wherein the propeller is carried in a pivot mounting enabling the propeller to be pivoted about an axis parallel to the swing cable and the steering system is connected to the propeller so that the pivotal position of the propeller about said axis is controlled by the steering system and the craft is steered by moving the pivotal position of the propeller about said axis by way of said steering system.

3. A powered ride apparatus according to claim 2 wherein the propeller and motor driving the propeller are both supported as a unit by said pivot mounting.

4. A powered ride apparatus according to claim 1 wherein the propeller is mounted at the rear of the craft behind the rider.

5. A powered ride apparatus according to claim 1 wherein the motor speed can be varied by the rider during the ride.

6. A powered ride apparatus according to claim 1 including a reposition system operable to lower the craft to the ground to enable a rider to get on and off the craft at the start and finish of a ride, and to raise the craft for the ride.

7. A powered ride apparatus according to claim 1 including a winch system operable to winch the craft to a start position from which the craft may be released to launch the craft at the start of a ride.

8. A powered ride apparatus according to claim 1 in which the craft carries the rider lying in a prone position on his or her stomach with the rider's head facing forward.

9. A powered ride apparatus according to claim 1 in which the support means from which the swing cable is suspended comprises a cable which extends substantially horizontally between two anchor points above the ground.

10. A powered ride apparatus according to claim 1 in which the support means comprises two support cables which extend substantially horizontally and at an angle to one another each between two anchor points positioned substantially opposite each other at a height above the ground, and which intersect at a junction point approximately midway along their lengths, and wherein the swing cable is suspended from said junction point.

* * * * *